United States Patent
Chen et al.

(10) Patent No.: US 11,759,005 B2
(45) Date of Patent: Sep. 19, 2023

(54) EMBEDDED NUMERICAL CONTROL ROTARY TABLE

(71) Applicant: KEDE NUMERICAL CONTROL CO., LTD., Liaoning (CN)

(72) Inventors: Hu Chen, Liaoning (CN); Yanxing Hou, Liaoning (CN); Chunhong Fan, Liaoning (CN); Xiumin Li, Liaoning (CN); Chuansi Zhang, Liaoning (CN); Zhihong Wei, Liaoning (CN); Cuijuan Guo, Liaoning (CN); Kuo Wang, Liaoning (CN)

(73) Assignee: KEDE NUMERICAL CONTROL CO., LTD., Liaoning (CN)

( * ) Notice: Subject to any disclaimer, the term of this patent is extended or adjusted under 35 U.S.C. 154(b) by 42 days.

(21) Appl. No.: 17/605,109

(22) PCT Filed: Jul. 7, 2020

(86) PCT No.: PCT/CN2020/100614
§ 371 (c)(1),
(2) Date: Oct. 20, 2021

(87) PCT Pub. No.: WO2021/004449
PCT Pub. Date: Jan. 14, 2021

(65) Prior Publication Data
US 2022/0202177 A1 Jun. 30, 2022

(30) Foreign Application Priority Data

Jul. 9, 2019 (CN) .......................... 201910615490.9

(51) Int. Cl.
*A47B 13/08* (2006.01)
(52) U.S. Cl.
CPC .......... *A47B 13/081* (2013.01); *A47B 13/088* (2013.01)

(58) Field of Classification Search
CPC ....... A47B 13/081; A47B 13/088; A47F 5/02; A47F 5/025; F16M 11/08
(Continued)

(56) References Cited

U.S. PATENT DOCUMENTS

| 2,324,343 A | * | 7/1943 | Wharton | ................. | A47F 5/025 |
| | | | | | 446/72 |
| 2,413,992 A | * | 1/1947 | Noble | ................. | B23Q 1/5468 |
| | | | | | 409/113 |

(Continued)

FOREIGN PATENT DOCUMENTS

| CN | 103028949 A | 4/2013 |
| CN | 203579428 U | 5/2014 |

(Continued)

*Primary Examiner* — Jose V Chen
(74) *Attorney, Agent, or Firm* — Muncy, Geissler, Olds & Lowe, P.C.

(57) ABSTRACT

The invention provides a nested numerical control rotary table, which comprises a large numerical control rotary table, a small rotary table, a large rotary table board and a small rotary table board nested in the large rotary table board, wherein the small rotary table board may be driven by the large numerical control rotary table as a part of the large rotary table board to run together with the large rotary table board, or be driven by the small rotary table to run independently. When the small rotary table board runs independently, the small rotary table is driven to ascend by a lifting oil cylinder, and a pull pin under the small rotary table board and a positioning pin on the small rotary table fixedly connect the small rotary table board with the small rotary table, which are locked by a clamp. The nested numerical control rotary table may complete the tasks of numerical control rotary tables with both large and small dimensions, which saves the production cost and improves the working efficiency. Moreover, switch between the large rotary table and the small rotary table is convenient, so time is saved.

5 Claims, 5 Drawing Sheets

(58) Field of Classification Search
USPC .................. 108/20, 94, 103, 139; 248/349.1
See application file for complete search history.

(56) References Cited

U.S. PATENT DOCUMENTS

| | | | | |
|---|---|---|---|---|
| 2,606,664 A * | 8/1952 | Messick | ................. | A47F 5/025 |
| | | | | 74/436 |
| 2,953,069 A | 9/1960 | Smith | | |
| 3,448,701 A * | 6/1969 | Cordova | ................. | A47B 11/00 |
| | | | | 108/20 |
| 4,330,696 A * | 5/1982 | Pomeroy | ............. | H05B 6/6411 |
| | | | | 219/755 |
| 4,656,951 A * | 4/1987 | Kimura | .................... | B23Q 1/38 |
| | | | | 108/20 |
| 4,754,111 A * | 6/1988 | Pomeroy | ............... | A47J 37/046 |
| | | | | 219/755 |
| 5,109,989 A * | 5/1992 | Kremmin | ................ | A47F 5/025 |
| | | | | 211/163 |
| 5,239,892 A * | 8/1993 | Sakai | ....................... | B23Q 1/52 |
| | | | | 384/100 |
| 5,468,299 A * | 11/1995 | Tsai | ........................ | C30B 25/12 |
| | | | | 108/138 |
| 5,501,119 A * | 3/1996 | Yanagisawa | .......... | B23P 19/069 |
| | | | | 74/89.32 |
| 5,553,865 A * | 9/1996 | Shoemaker, Jr | ...... | A63F 7/0058 |
| | | | | 221/209 |
| 5,784,932 A * | 7/1998 | Gilberti | ................. | B23Q 17/24 |
| | | | | 108/22 |
| 5,937,764 A * | 8/1999 | Olivier | ................... | A47B 11/00 |
| | | | | 108/20 |
| 7,798,071 B2 * | 9/2010 | Ishikawa | ............... | F16C 19/502 |
| | | | | 248/349.1 |
| 11,103,060 B1 * | 8/2021 | Ho | ........................ | A47B 13/10 |
| 2013/0047896 A1 * | 2/2013 | Fujimoto | ............. | B23Q 1/0027 |
| | | | | 108/50.11 |
| 2015/0083029 A1 * | 3/2015 | Pan | ........................ | A47B 9/00 |
| | | | | 108/104 |
| 2016/0135587 A1 * | 5/2016 | Satou | ................. | G03F 7/70716 |
| | | | | 108/143 |
| 2016/0166109 A1 * | 6/2016 | Banal | ..................... | A47B 11/00 |
| | | | | 108/50.13 |

FOREIGN PATENT DOCUMENTS

| | | |
|---|---|---|
| CN | 104493510 A | 4/2015 |
| CN | 104690603 A | 6/2015 |
| CN | 109623416 A | 4/2019 |
| CN | 110449922 A | 11/2019 |
| JP | S5947147 A | 3/1984 |

* cited by examiner

EMBEDDED NUMERICAL CONTROL ROTARY TABLE

BACKGROUND OF THE INVENTION

1. Technical Field

The invention relates to the field of numerical control machine tools, in particular to a nested numerical control rotary table.

2. Description of Related Art

With the development of numerical control machine tools, there are more and more four-axis and five-axis numerical control machine tools, and numerical control rotary tables are becoming more and more important. Because the sizes of parts to be machined are quite different, and the requirements for machining accuracy are different, numerical control rotary tables need to have different dimensions and rotation accuracies to meet machining needs.

Numerical control rotary tables with different dimensions have their own advantages in the machining process, and a single numerical control rotary table cannot complete the tasks of multiple numerical control rotary tables with different dimensions.

BRIEF SUMMARY OF THE INVENTION

The invention provides a nested numerical control rotary table, which integrates a large rotary table and a small rotary table so as to complete the tasks of numerical control rotary tables with both large and small dimensions. Moreover, switch between the large rotary table and the small rotary table is convenient, so time is saved.

A nested numerical control rotary table comprises a large numerical control rotary table and a large rotary table board, and further comprises a small rotary table, a small rotary table board, a lifting oil cylinder, a bracket, a positioning pin boss, a positioning pin, an elastic piece, a shifting pin, a clamp and a guide rail;

wherein the small rotary table board is nested in the large rotary table board, the positioning pin boss is arranged at a joint between the large rotary table board and the small rotary table board, a pin hole is formed in a side surface of the small rotary table board, the positioning pin comprises a positioning pin body arranged in the positioning pin boss, a driving curved surface arranged at an outer end of the positioning pin body and a positioning pin head arranged on a side surface of the driving curved surface, the elastic piece is arranged in the positioning pin boss, and the positioning pin head may be inserted into the pin hole in the side surface of the small rotary table board under the push of the elastic piece to connect the small rotary table board with the large rotary table board;

a top surface of the shifting pin is an inclined plane, fixed on a side surface of the small rotary table and positioned below the driving curved surface, a top end of the shifting pin is higher than the small rotary table, the bracket fixedly connects a top end of a piston rod of the lifting oil cylinder with the small rotary table, the clamp is fixed on the bracket, the guide rail is fixed on a side surface of the large numerical control rotary table, and the guide rail is in sliding connection with the clamp;

a positioning cone is arranged on the small rotary table, and a pull pin corresponding to the positioning cone in position is arranged under the small rotary table board; and the lifting oil cylinder lifts the small rotary table along the guide rail through the bracket, a top surface of the shifting pin makes contact with the driving curved surface, as the small rotary table ascends, the shifting pin pushes the positioning pin head out of the pin hole so that the small rotary table board is separated from the large rotary table board, the pull pin is fixedly connected with the positioning cone, the small rotary table board is fixedly connected to the small rotary table, the small rotary table drives the small rotary table board to work, and the clamp clasps the guide rail to fix the position of the small rotary table.

Further, the small rotary table further comprises a motherboard, a hollow shaft, a base, a rotary table bearing, a stator, a rotor flange, a rotor and a stator flange, the hollow shaft is fixedly connected to the motherboard by screws, the rotor flange is fixedly connected with the rotor and the hollow shaft, the stator flange is fixedly connected with the stator and the base by screws, and the rotary table bearing is arranged between the base and the hollow shaft.

Further, four positioning cones are arranged, which are uniformly distributed on a top surface of the small rotary table near an outer edge.

Further, two positioning pin heads are arranged, which are positioned on two sides of the driving curved surface.

Further, two guide rails are arranged, and each guide rail is in sliding connection with three clamps.

Further, two lifting oil cylinders are arranged, which are positioned on two sides of the small rotary table.

The nested numerical control rotary table provided by the invention may complete the tasks of numerical control rotary tables with both large and small dimensions, which saves the production cost and improves the working efficiency. Moreover, switch between the large rotary table and the small rotary table is convenient, so time is saved.

BRIEF DESCRIPTION OF THE SEVERAL VIEWS OF THE DRAWINGS

In order to more clearly explain the embodiments of the invention or the technical solution in the prior art, the following will briefly introduce the drawings needed in the description of the embodiments or the prior art. Obviously, the drawings in the following description are only some embodiments of the invention. For those of ordinary skill in the art, other drawings can be obtained according to the provided drawings without paying creative labor.

Figure 1:
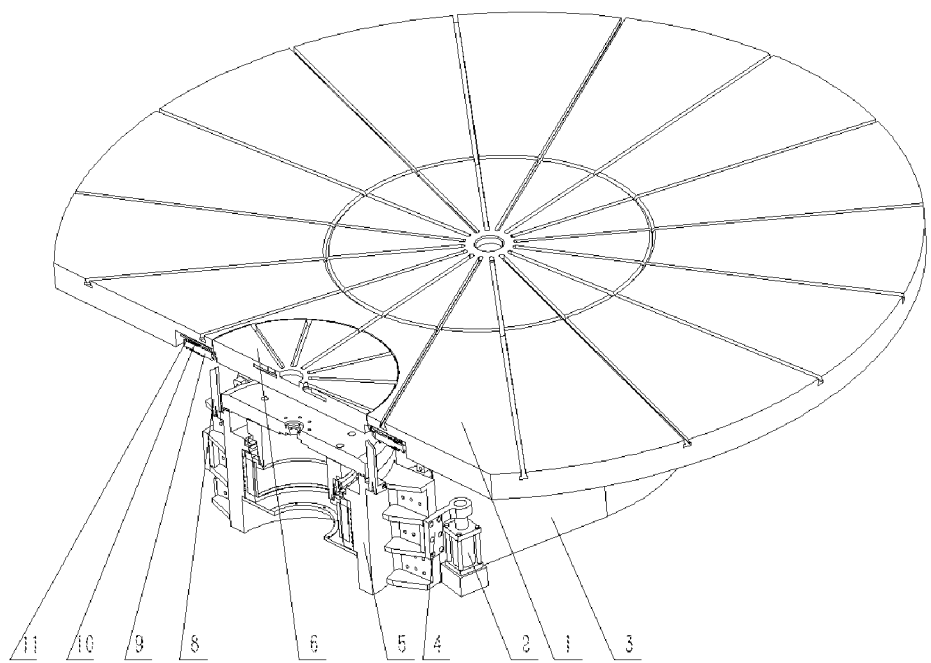
FIG. 1 is a sectional structural diagram of a nested numerical control rotary table disclosed by the invention.
Figure 2:
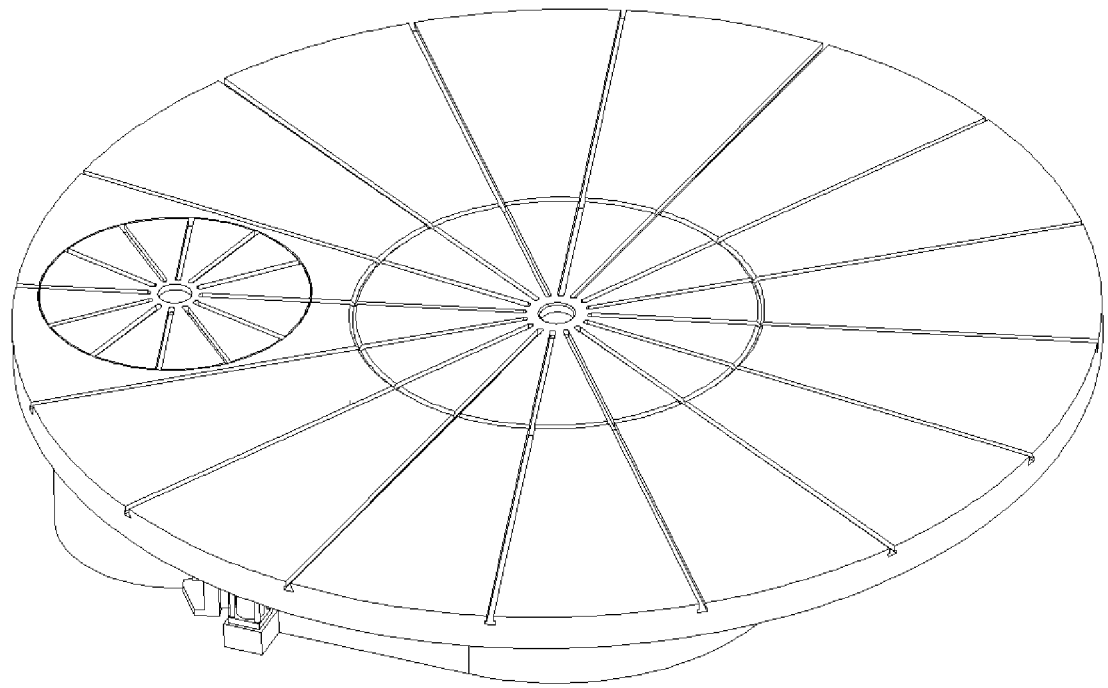
FIG. 2 is an overall structural diagram of a nested numerical control rotary table disclosed by the invention.
Figure 3:
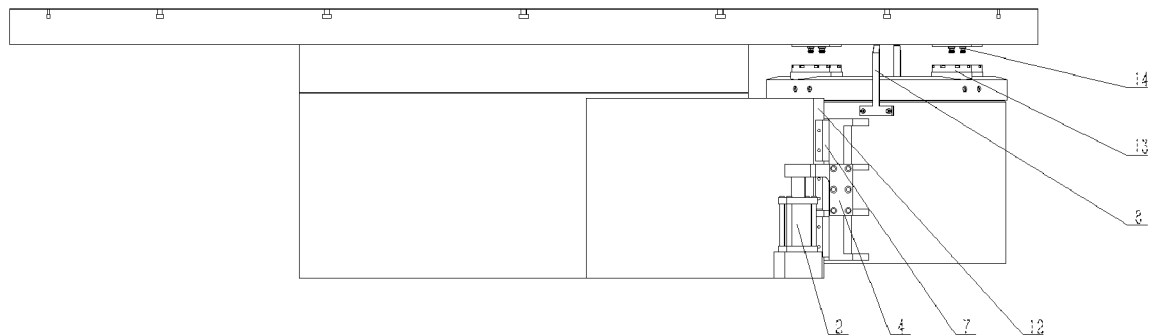
FIG. 3 is a side view of a nested numerical control rotary table.

In the drawing: 1. large rotary table board, 2. lifting oil cylinder, 3. large numerical control rotary table, 4. bracket, 5. small rotary table, 6. small rotary table board, 7. clamp, 8. shifting pin, 9. positioning pin, 10. elastic piece, 11.

positioning pin boss, 12. guide rail, 13. positioning cone, 14. pull pin, 51. motherboard, 52. hollow shaft, 53. base, 54. rotary table bearing, 55. stator, 56. rotor flange, 57. rotor, 58. stator flange, 91. positioning pin body, 92. driving curved surface, 93. positioning pin head.

DETAILED DESCRIPTION OF THE INVENTION

In order to clarify the purpose, technical solution and advantages of the embodiments of the invention, the technical solution in the embodiments of the invention will be described clearly and completely below with reference to the drawings in the embodiments of the invention. Obviously, the described embodiments are only part of the embodiments of the invention, not all of the embodiments. Based on the embodiments of the invention, all other embodiments obtained by those of ordinary skill in the art without creative labor are within the scope of the invention.

Figure 8:
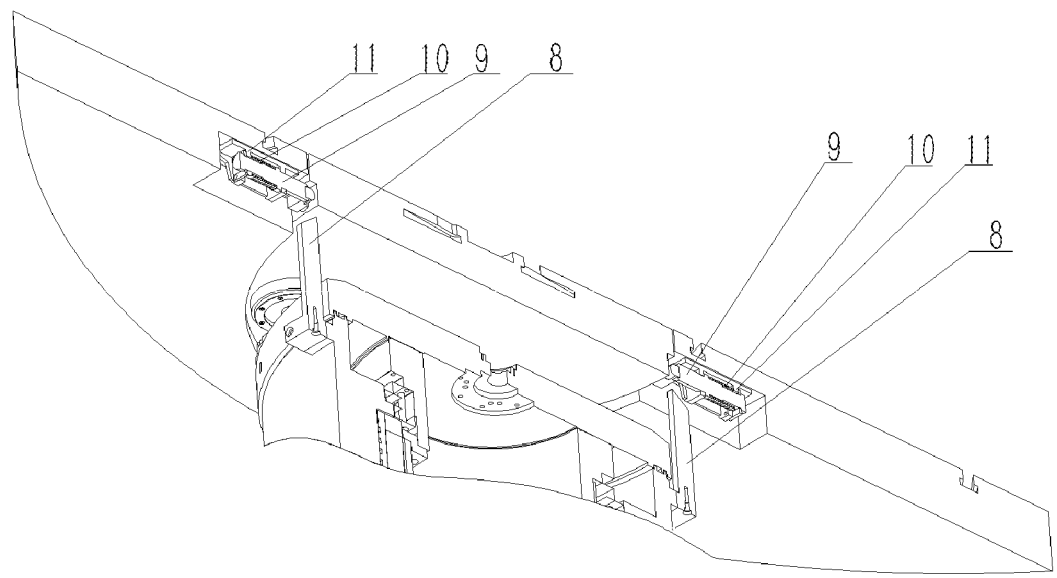
FIG. 8 is a diagram of connection between a small rotary table board and a large rotary table board.
Figure 9:
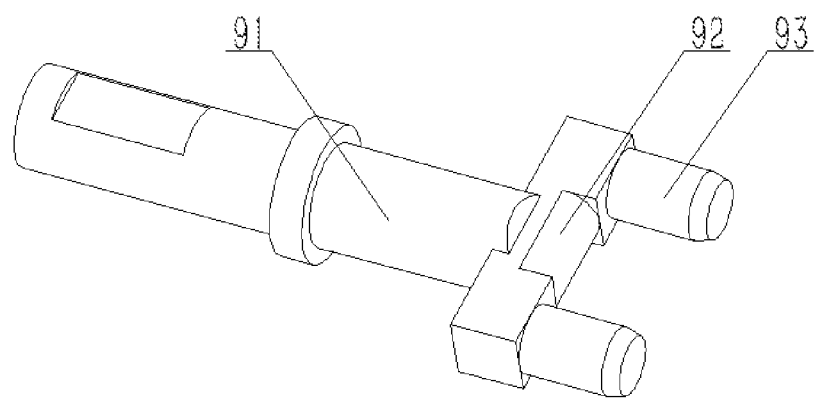
FIG. 9 is a structural diagram of a positioning pin.
Figure 10:
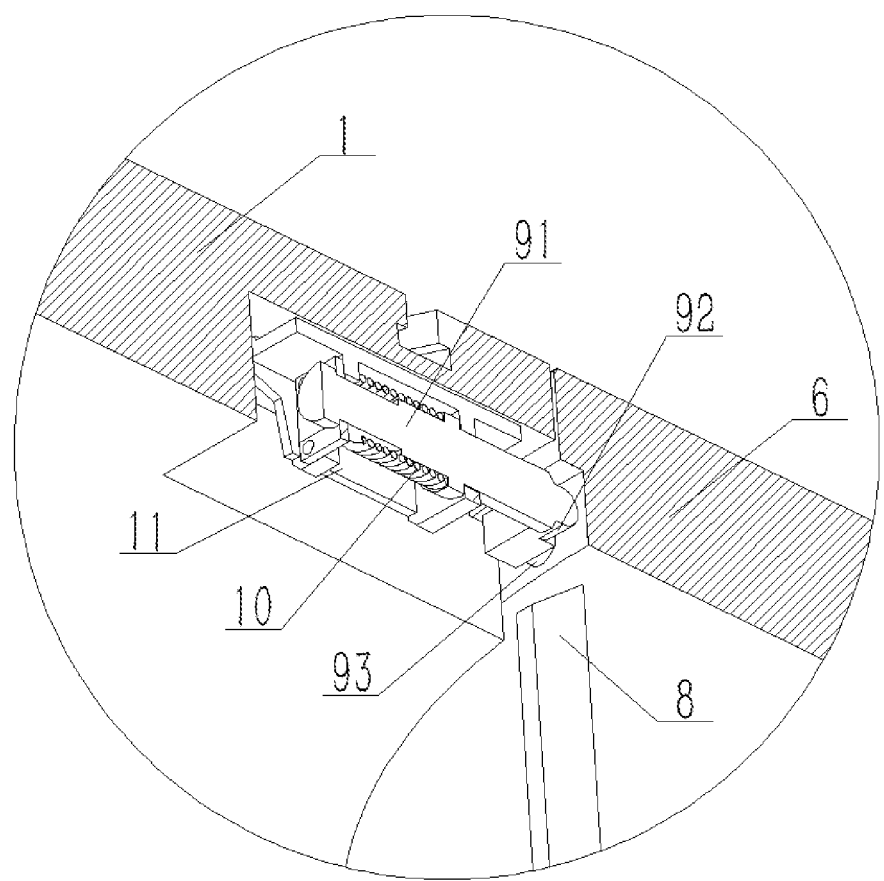
FIG. 10 is a diagram of connection between a large rotary table board and a small rotary table board.

As shown in FIGS. 1, 2, 3 and 5, a nested numerical control rotary table comprises a large numerical control rotary table 3 and a large rotary table board 1, and further comprising a small rotary table 5, a small rotary table board 6, a lifting oil cylinder 2, a bracket 4, a positioning pin boss 11, a positioning pin 9, an elastic piece 10, a shifting pin 8, a clamp 7 and a guide rail 12;

As shown in FIGS. 8, 9 and 10, the small rotary table board 6 is nested in the large rotary table board 1, the positioning pin boss 11 is arranged at a joint between the large rotary table board 1 and the small rotary table board 6 and fixed in the large rotary table board, a pin hole is formed in a side surface of the small rotary table board 6, the positioning pin 9 comprises a positioning pin body 91 arranged in the positioning pin boss 11, a driving curved surface 92 arranged at an outer end of the positioning pin body and a positioning pin head 93 arranged on a side surface of the driving curved surface, the elastic piece 10 is arranged in the positioning pin boss 11, the positioning pin head 93 may be inserted into the pin hole in the side surface of the small rotary table board 6 under the push of the elastic piece 10 to connect the small rotary table board 6 with the large rotary table board 1, the elastic piece 10 is generally a spring, and the driving curved surface is a cylindrical surface.

Figure 6:
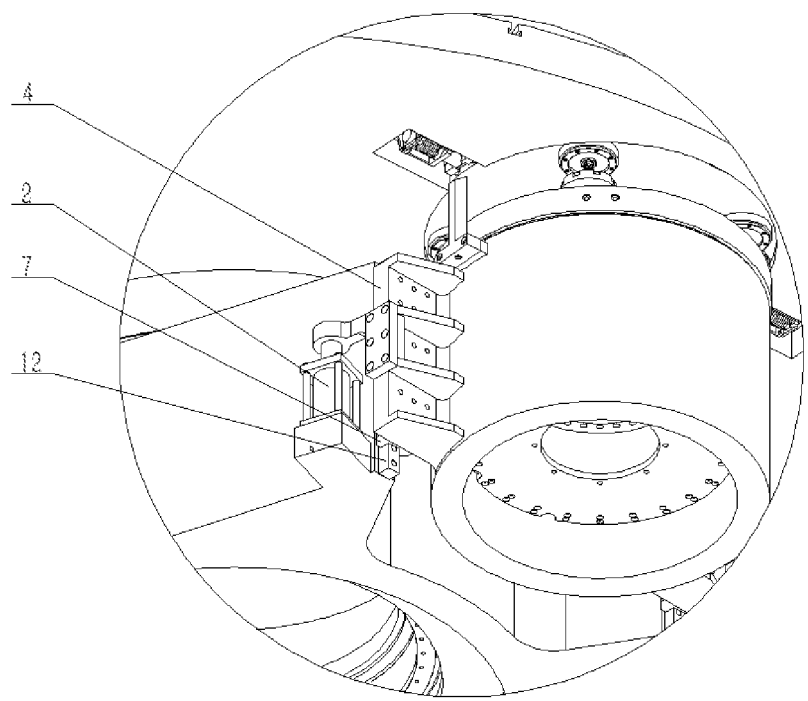
FIG. 6 is a diagram of connection between a guide rail and a clamp.
Figure 7:
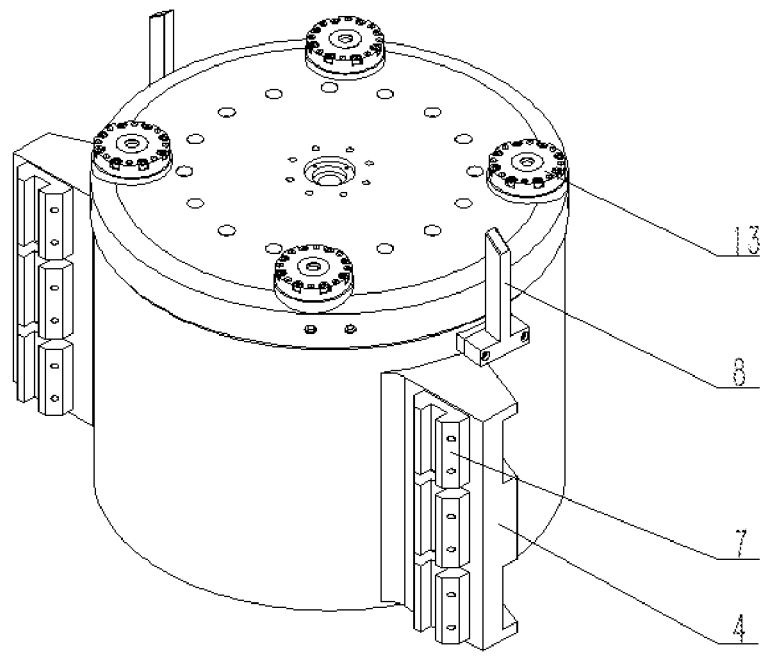
FIG. 7 is an overall diagram of a small rotary table.

A top surface of the shifting pin 8 is an inclined plane, fixed on a side surface of the small rotary table 5 and positioned below the driving curved surface 92, a top end of the shifting pin 8 is higher than the small rotary table 5, as shown in FIGS. 6 and 7, the bracket 4 fixedly connects a top end of a piston rod of the lifting oil cylinder 2 with the small rotary table 5, the clamp 7 is fixed on the bracket 4, the guide rail 12 is fixed on a side surface of the large numerical control rotary table 3, and the guide rail 12 is in sliding connection with the clamp 7. The guide rail and the clamp belong to the prior art, and the clamp is loosened and tightened to realize sliding and fixing on the guide rail, which is a common method used by people in the industry and is widely used in many fields such as machine tools, so the working principle is not described here.

A positioning cone 13 is arranged on the small rotary table 5, and a pull pin 14 corresponding to the positioning cone 13 in position is arranged under the small rotary table board 6. The positioning cone and the pull pin belong to the prior art, and the fixed connection and separation between the rotary table and the rotary table board are realized by using the positioning and fixed connection functions of the pull pin and the positioning cone, which is a common method used by people in the industry and is widely used in the field of machine tools, so the working principle is not described here.

When a part needs to be machined with the large numerical control rotary table, the positioning pin 9 fixedly connects the small rotary table board 6 with the large rotary table board 1, which are driven by the large numerical control rotary table 3. When a part needs to be machined with the small rotary table, the lifting oil cylinder 2 lifts the small rotary table 5 along the guide rail 12 through the bracket 4, the top surface of the shifting pin 8 makes contact with the driving curved surface 92, as the small rotary table 5 ascends, the shifting pin 8 pushes the positioning pin 9 to the outside of the small rotary table board 6, the positioning pin head 93 is pushed out of the pin hole so that the small rotary table board 6 is separated from the large rotary table board 1, and the separated small rotary table board 6 may rotate independently; and the small rotary table 5 continues to rise, the pull pin 14 is fixedly connected with the positioning cone 13 so that the small rotary table board 6 is fixedly connected to the small rotary table 5, the small rotary table drives the small rotary table board to work, and after the small rotary table rises to a working position, the clamp 7 clasps the guide rail 12 to fix the position of the small rotary table 5.

Figure 4:
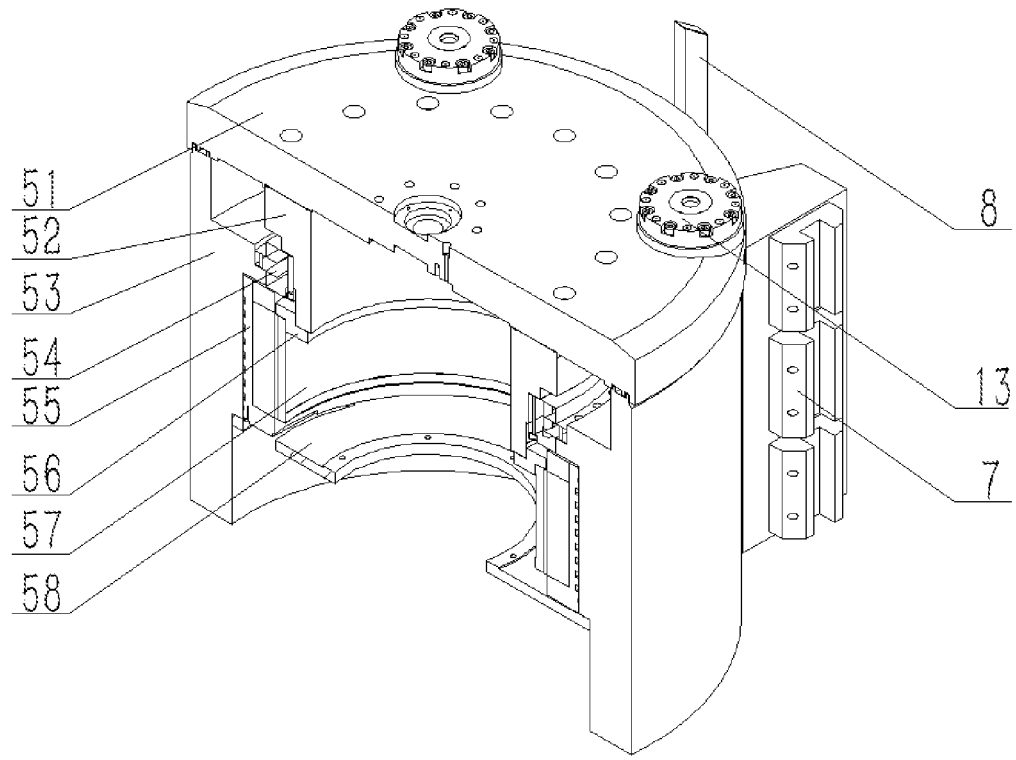
FIG. 4 is a sectional view of a small rotary table.
Figure 5:
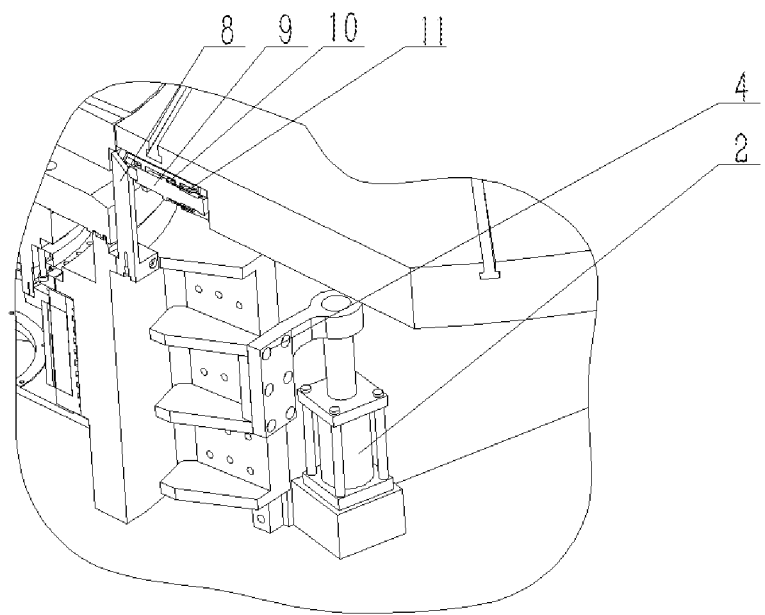
FIG. 5 is a diagram of connection between a small rotary table and a large rotary table.

Further, as shown in FIG. 4, the small rotary table further comprises a motherboard 51, a hollow shaft 52, a base 53, a rotary table bearing 54, a stator 55, a rotor flange 56, a rotor 57 and a stator flange 58, the hollow shaft 52 is fixedly connected to the motherboard 51 by screws, the rotor flange 56 is fixedly connected with the rotor 57 and the hollow shaft 52, the stator flange 58 is fixedly connected with the stator 55 and the base 53 by screws, and the rotary table bearing 54 is arranged between the base 53 and the hollow shaft 52.

Further, four positioning cones are arranged, which are uniformly distributed on a top surface of the small rotary table 5 near an outer edge.

Further, two positioning pin heads 93 are arranged, which are positioned on two sides of the driving curved surface 92.

Further, two guide rails 12 are arranged, and each guide rail 12 is in sliding connection with three clamps 7. Two guide rails may make the ascending process of the small rotary table more stable, and three clamps provide enough restraining force to fix the position of the small rotary table.

Further, two lifting oil cylinders 2 are arranged and positioned on two sides of the small rotary table, and a base of the small rotary table is fixed to the large rotary table. The two lifting oil cylinders may make the small rotary table ascend more stably.

Finally, it should be noted that the above embodiments are only used to illustrate the technical solutions of the invention, but not to limit it. Although the invention has been described in detail with reference to the foregoing embodiments, those of ordinary skill in the art should understand that the technical solutions described in the foregoing embodiments can still be modified, or some or all of the technical features can be equivalently replaced, and these modifications or substitutions do not make the essence of the corresponding technical solutions deviate from the scope of the technical solutions of each embodiment of the invention.

What is claimed is:
1. A nested numerical control rotary table, comprising a large numerical control rotary table and a large rotary table board, and further comprising a small rotary table, a small rotary table board, a lifting oil cylinder, a bracket, a posi- tioning pin boss, a positioning pin, an elastic piece, a shifting pin, a clamp and a guide rail;

wherein the small rotary table board is nested in the large rotary table board, the positioning pin boss is located at a joint between the large rotary table board and the small rotary table board, a pin hole is formed in a side surface of the small rotary table board, the positioning pin comprises a positioning pin body located in the positioning pin boss, a driving curved surface located at an outer end of the positioning pin body and a positioning pin head located on a side surface of the driving curved surface, the elastic piece is located in the positioning pin boss, and the positioning pin head is inserted into the pin hole in the side surface of the small rotary table board under the push of the elastic piece to connect the small rotary table board with the large rotary table board;

a top surface of the shifting pin is an inclined plane, the shifting pin is fixed on a side surface of the small rotary table and positioned below the driving curved surface, a top end of the shifting pin is higher than the small rotary table, the bracket fixedly connects a top end of a piston rod of the lifting oil cylinder with the small rotary table, the clamp is fixed on the bracket, the guide rail is fixed on a side surface of the large numerical control rotary table, and the guide rail is in sliding connection with the clamp;

a positioning cone is located on the small rotary table, and a pull pin corresponding to the positioning cone in position is located under the small rotary table board; and the lifting oil cylinder lifts the small rotary table along the guide rail through the bracket, a top surface of the shifting pin makes contact with the driving curved surface, as the small rotary table is lifted, the shifting pin pushes the positioning pin head out of the pin hole so that the small rotary table board is separated from the large rotary table board, the pull pin is fixedly connected with the positioning cone, the small rotary table board is fixedly connected to the small rotary table, the small rotary table drives the small rotary table board to work, and the clamp clasps the guide rail to fix the position of the small rotary table;

wherein the small rotary table further comprises a motherboard, a hollow shaft, a base, a rotary table bearing, a stator, a rotor flange, a rotor and a stator flange, the hollow shaft is fixedly connected to the motherboard by screws, the rotor flange is fixedly connected with the rotor and the hollow shaft, the stator flange is fixedly connected with the stator and the base by screws, and the rotary table bearing is located between the base and the hollow shaft.

2. The nested numerical control rotary table according to claim 1, wherein four positioning cones are arranged, which are uniformly distributed on a top surface of the small rotary table near an outer edge.

3. The nested numerical control rotary table according to claim 1, wherein two positioning pin heads are arranged, which are positioned on two sides of the driving curved surface.

4. The nested numerical control rotary table according to claim 1, wherein two guide rails are arranged, and each guide rail is in sliding connection with the clamp.

5. The nested numerical control rotary table according to claim 1, wherein two lifting oil cylinders are arranged, which are positioned on two sides of the small rotary table.

* * * * *